Sept. 24, 1963 A. L. DE FINA 3,105,123

PRESET CALL TRANSMITTER

Filed Aug. 17, 1961 4 Sheets-Sheet 1

INVENTOR
A. L. DE FINA
BY V. P. Ciriolo

ATTORNEY

INVENTOR
A. L. DE FINA
BY V. P. Griolo
ATTORNEY

INVENTOR
A. L. DE FINA
BY V. P. Friolo
ATTORNEY

Sept. 24, 1963 A. L. DE FINA 3,105,123

PRESET CALL TRANSMITTER

Filed Aug. 17, 1961 4 Sheets-Sheet 4

INVENTOR
A. L. DE FINA
BY V. P. Buolo
ATTORNEY 3,105,123
PRESET CALL TRANSMITTER
Angelo L. De Fina, Brooklyn, N.Y., assignor to Bell Telephone Laboratories, Incorporated, New York, N.Y., a corporation of New York
Filed Aug. 17, 1961, Ser. No. 132,064
6 Claims. (Cl. 179—90)

This invention relates to telephone substation apparatus and, more particularly, to preset call transmitters.

The development of electronic and other types of fast operating switching systems for the telephone industry has required new developments in telephone substation apparatus to utilize fully the many advantages and features of such switching systems. In this connection, various improvements have been made in substation apparatus generating multifrequency signals to reduce their signaling time.

Experience has indicated that a preset call transmitter adapted to generate multifrequency signals can be designed to have a signaling time which substantially approximates the operating time of the new switching systems. A preset call transmitter provides numerous advantages. It shortens the interval of time required to place a call and thereby makes it possible to handle a greater number of calls with less switching equipment. It reduces dialing errors since a visible check can be made of the called number before it is transmitted.

An object of the present invention is a preset call transmitter for multifrequency signaling.

Another object is a preset call transmitter adapted to display a telephone number and simultaneously define mechanically each digit of the telephone number in a coding system, typically a two-out-of-five code.

A specific object is a compact preset call transmitter which translates sequentially a telephone number encoded in mechanical form into multifrequency signals corresponding to the mechanically encoded telephone number.

These objectives are achieved by the present invention which comprises a plurality of manually controlled selectors or number wheels for displaying a subscriber number desired to be called, each of said selectors being adapted to define mechanically any number from zero to nine in a coding system, typically a two-out-of-five coding system. A multifrequency signal generator including a plurality of tapped connections for producing discrete signals has access to said selectors through an array of conductors.

In a preferred embodiment of the invention, each of the number wheels, or selectors, comprises a wheel of substantially T section. Affixed to each side of the web of each number wheel are ten radially disposed contact arms of varying length. Each arm has a contact member at each end, the centrally disposed contact members being arranged in a circular pattern the center of which may coincide with the axis of a shaft about which the wheels are manually rotated or, as in the preferred embodiment, be offset therefrom. The radially disposed contact arms may be molded into the web portion of the wheel or they may be molded into cup-shaped drum members which, in turn, may be affixed to the web. Each of the number wheels or selectors is supported by and rotatable about the peripheries of the fixed members adjacent thereto which function as mounting blocks for a plurality of vertically aligned contact members each of which is connected to a terminal of an individual one of a plurality of tuning circuits included in a signal generator. The fixed members disposed at each end of the preset digit selecting mechanism function as journals for the shaft. When the number wheel is positioned to designate a particular one of the ten digits, the end contact member of the radially disposed arm corresponding to the chosen digit will engage the coresponding contact member disposed in the fixed mounting member. The tuning circuit corresponding to the selected digit is completed when the shaft rotates and a lobe affxed thereto engages the centrally disposed contact member on the other end of the arm. Electrical continuity is provided through the shaft from the selected terminal to a common terminal to complete the tuning circuit.

A plurality of lobes are disposed on the shaft to individually and sequentially engage the contact members corresponding to the preselected digits. With two sets of contact arms associated with each number wheel and simultaneously rotated thereby, two code frequencies are provided for each digit. In order to sequentially complete the pair of tuning circuits corresponding to each of the preselected digits, two sets of helically disposed lobes are employed. Each set of lobes may be disposed on separate simultaneously driven shafts or, as in the preferred embodiment, on a composite shaft comprising a central rod portion for one set of lobes and an insulated sleeve portion for the other set of lobes.

A feature of the present invention resides in means comprising a plurality of selectors or number wheels which cooperate with a multifrequency oscillator circuit to select at least two oscillator frequencies for each selector, the frequency combination uniquely defining each position of the selectors.

Another feature resides in means for providing a plurality of selectors with common access to a multifrequency oscillator circuit and sequentially connecting said selectors to said oscillator circuit.

Still another feature resides in means for intermittently connecting a multifrequency oscillator to a telephone line while a subscriber number mechanically encoded is translated one digit at a time into multifrequency electrical signals corresponding to the mechanically encoded subscriber numbers.

The nature of the invention and its distinguishing features and advantages will be more clearly understood from the following detailed description and the accompanying drawings in which.

Figures 2, 9:
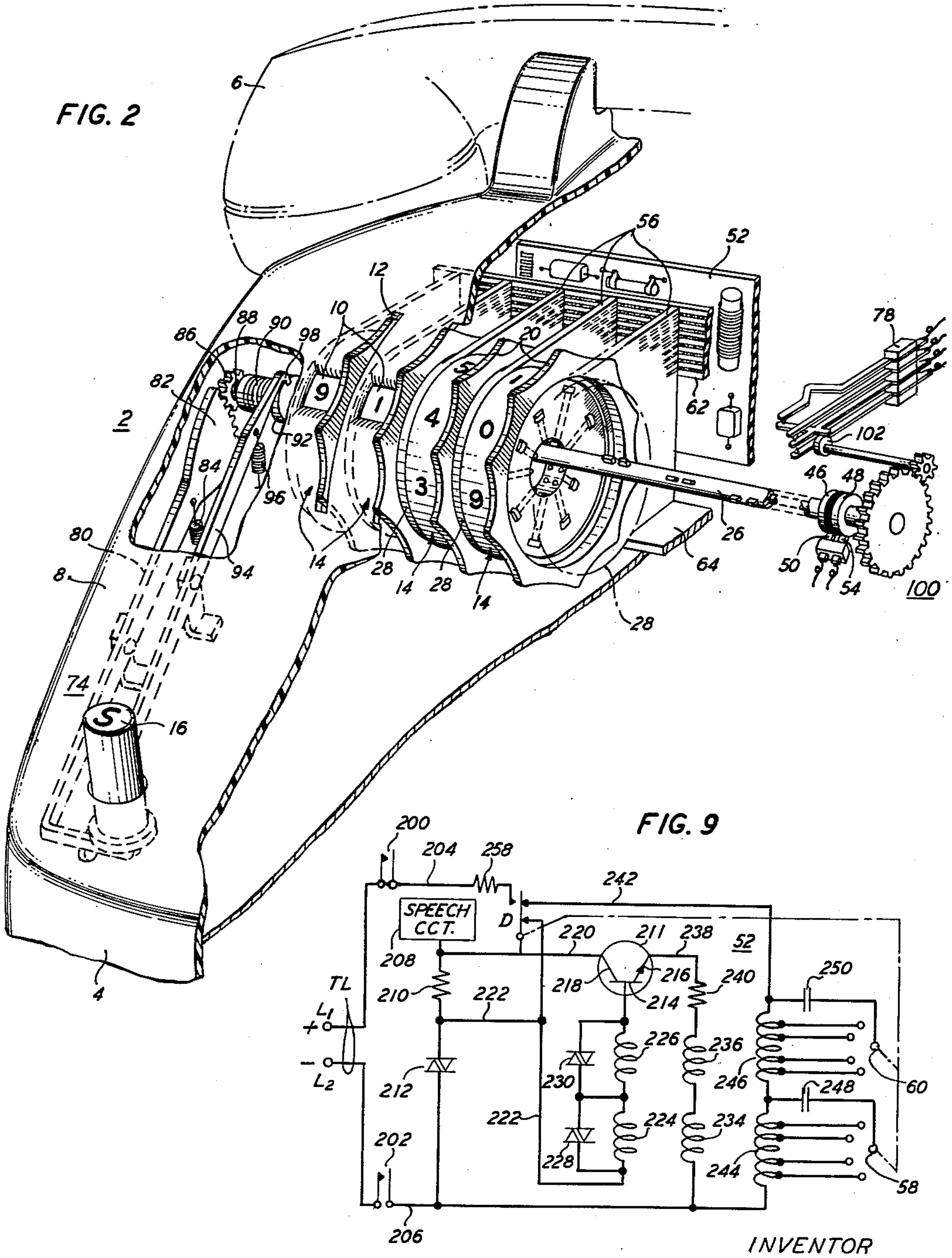
FIG. 2 is a view in perspective of the telephone set shown in FIG. 1 with portions broken away to show the preset calling mechanism and selectors including therein.
FIG. 9 is an electrical schematic representation of the signaling or oscillating circuit of the telephone set shown in FIG. 2.

As shown in FIG. 2, a telephone set 2 incorporating the present invention includes a base 4 and a handset 6 joined by the usual handset cord (not shown) and connected to a telephone line TL (see FIG. 9) by a line cord (not shown). The speech elements of the set 2 are all of a conventional type well known to the art. On the sloping front wall 8 of the base is an elongated opening 10 having a plurality of side branches 12 through which segments of ten digit wheels or selectors 14 protrude. The number of digit wheels is not necessarily limited to ten, but may be more or less depending upon the number of digits desired to be transmitted. Ten digit wheels have been selected for reasons of convenience only and since the nationwide numbering plan is ordinarily based on ten digits.

The base of the telephone set also includes a pushbutton 16 labeled with the indicia S, indicative of the word "send." As explained hereinafter, the pushbutton is used to initiate the actual calling signal transmission after setting up the numbers on the digit wheels.

Figure 5:
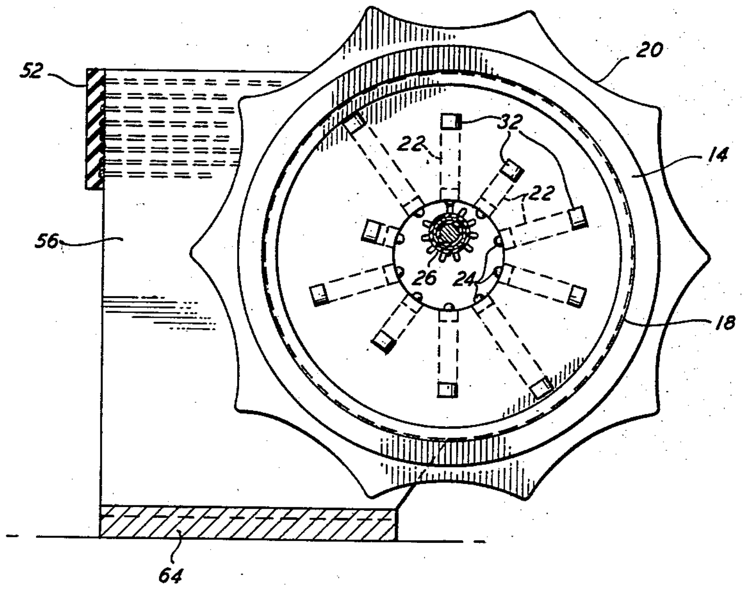
FIG. 5 is a sectional view taken along line 5—5 of FIG. 3.
Figure 6:
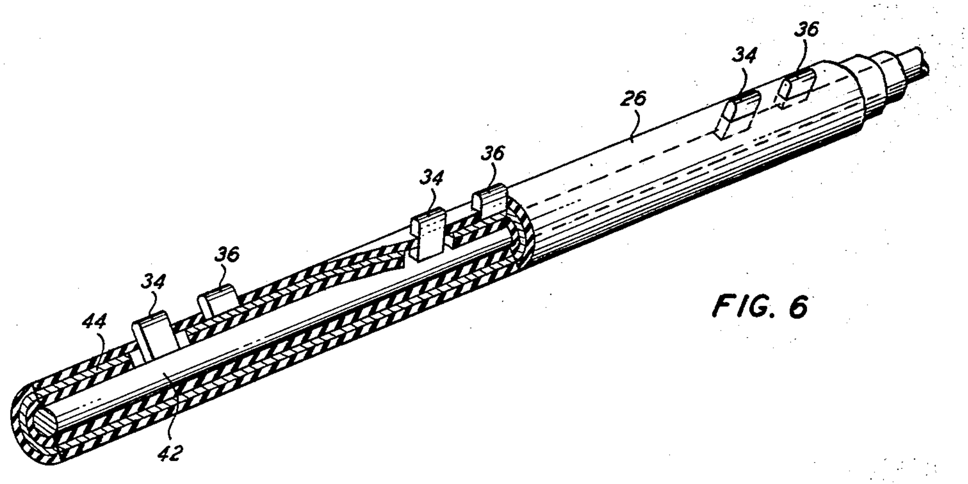
FIG. 6 is a view in perspective of the selector shaft shown in FIG. 3.

Each digit selector 14 comprises a wheel of substantially T section which includes a drum portion 18 upon which are imprinted a plurality of indicia, and a flange portion having a plurality of recesses 20. As shown in FIG. 5, there are affixed to each side of the web of each selector ten radially disposed contact arms 22 of varying length. Each arm has a contact member at each end, the centrally disposed contact members 24 being arranged in a circular pattern the center of which is offset from the axis of shaft 26. The radially disposed arms 22 may be molded into the web portion of the selector or they may be molded into cup-shaped drum members which, in turn, may be affixed to the web.

Figure 3:
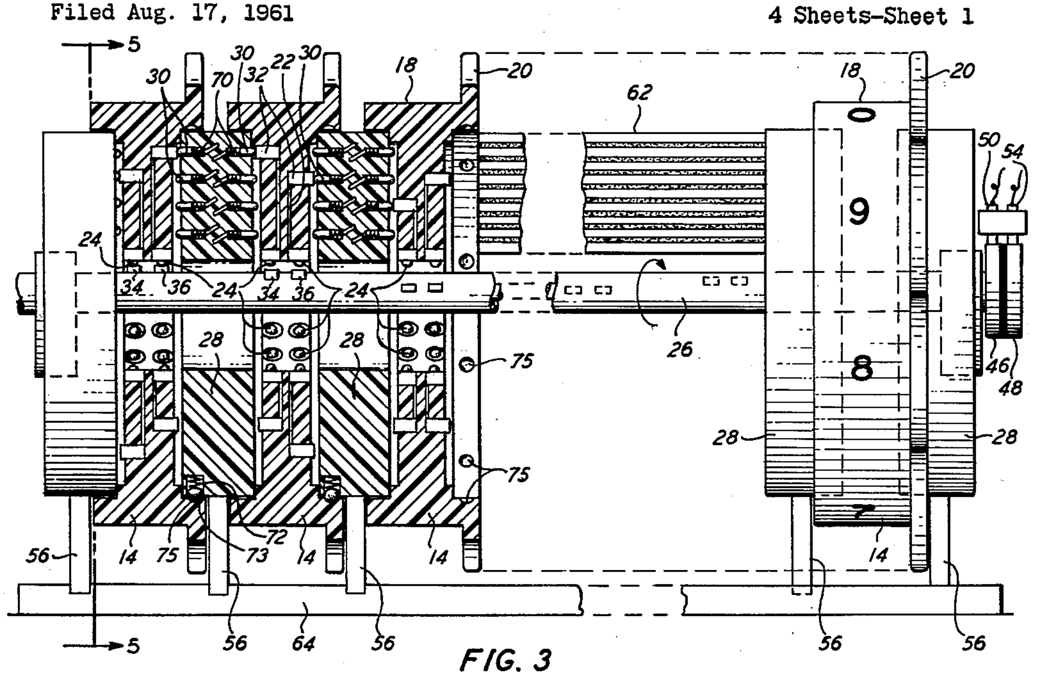
FIG. 3 is a front view, partly in section, of a preferred embodiment of the preset digit selecting mechanism.
Figure 4:
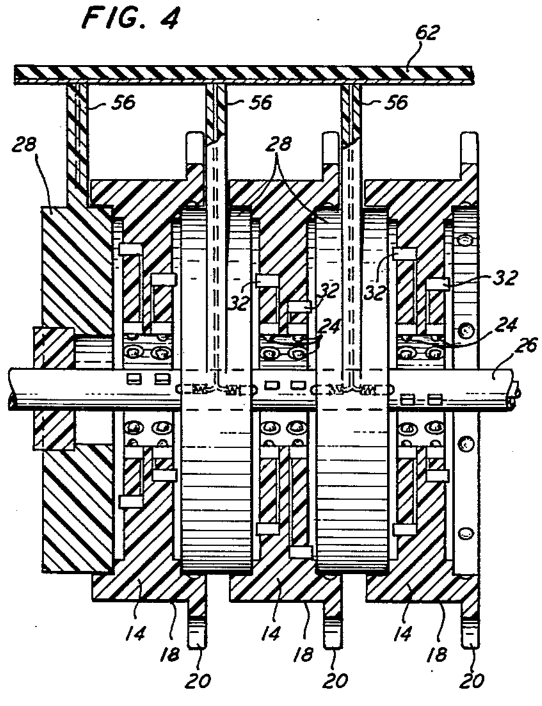
FIG. 4 is a top view, partly in section, of the mechanism shown in FIG. 3.
Figure 1:
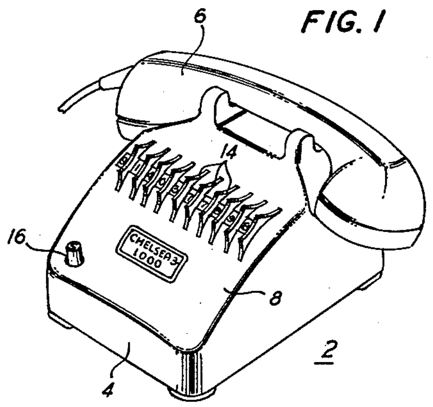
FIG. 1 is a view in perspective of a telephone set embodying the present invention.

As shown in FIGS. 3 and 4, each selector is supported by and rotatable about the peripheries of the fixed members 28 adjacent thereto which function as mounting blocks for vertically aligned contact members 30. The fixed members disposed at each end of the digit selecting mechanism function as journals for shaft 26. Each contact member 30 is connected to an individual tap on windings 244 or 246 of oscillator 52 shown in FIG. 9. The contact members connected to winding 244 are disposed on the same side of each of the fixed members 28 while the contact members connected to winding 246 are disposed on the other side of each of the fixed members. When the number wheel or selector is positioned to designate a particular one of the ten digits, the end contact member 32 of the radially disposed arm 22 corresponding to the chosen digit will engage the corresponding contact member 30 disposed in the fixed mounting member 28.

Figure 7:
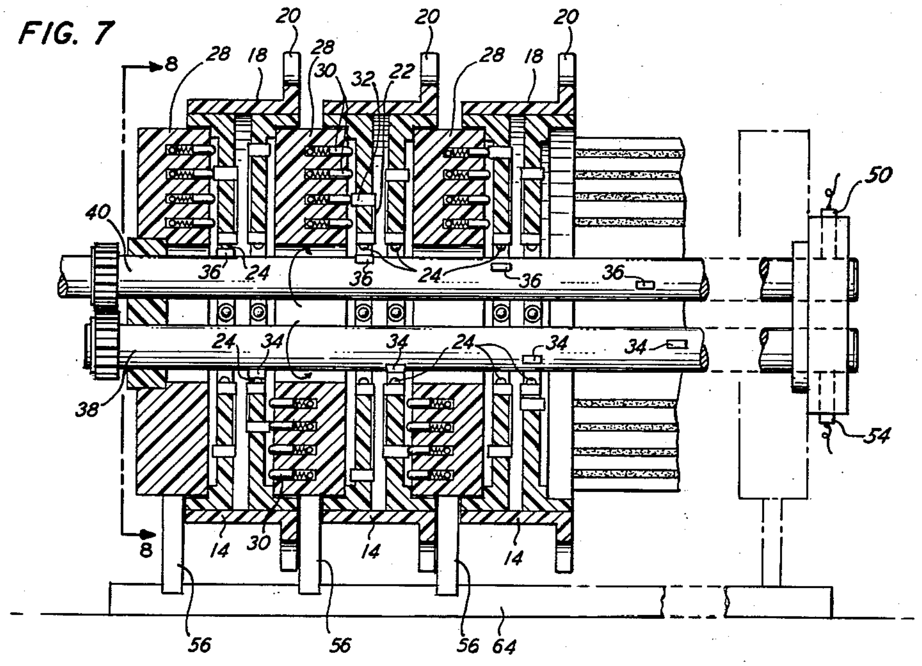
FIG. 7 is a front view, partly in section, of another embodiment of the preset digit selecting mechanism.
Figure 8:
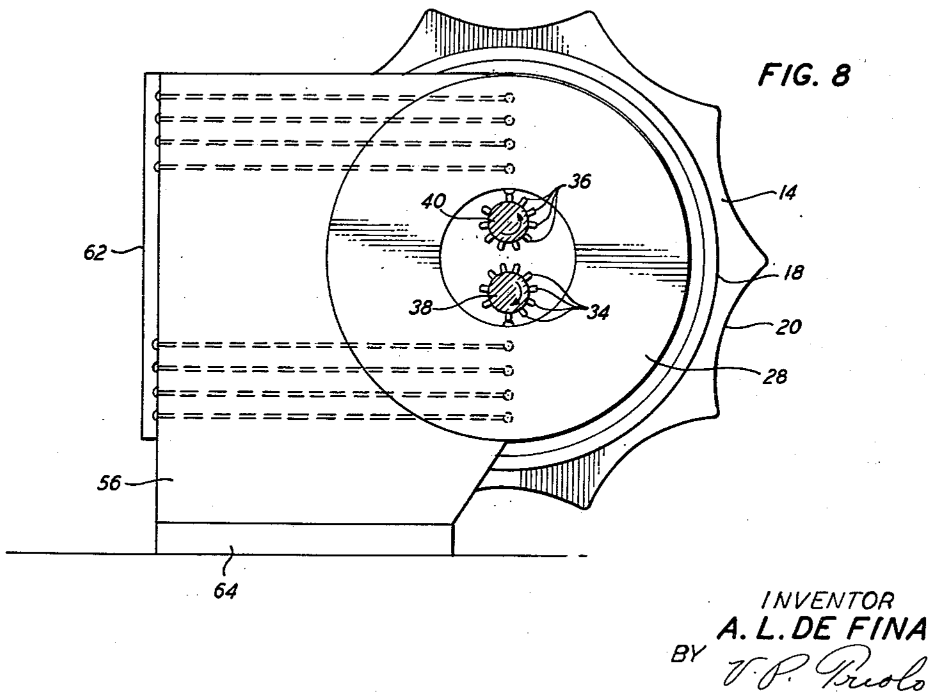
FIG. 8 is a sectional view taken along line 8—8 of FIG. 7.

The tuning circuit corresponding to the selected digit is completed when the shaft 26 rotates and lobes 34 and 36 affixed thereto engage the centrally disposed contact member 24 of arms 22 corresponding to the preselected digit. A plurality of lobes 34 and 36 are disposed on the shaft in helical arrangement to individually and sequentially engage the contact members 24 corresponding to the preselected digits. With two sets of contact arms 22 associated with each number wheel and simultaneously rotated thereby, two code frequencies are provided for each digit. In order to sequentially complete the pair of tuning circuits corresponding to each of the preselected digits, two sets (34 and 36) of helically disposed lobes are employed. Each set of lobes may be disposed on separate simultaneously driven shafts 38 and 40, as indicated in FIGS. 7 and 8, or, as in the preferred embodiment, on a composite shaft 26 comprising a central rod portion 42 for lobes 34 and an insulated sleeve portion 44 for lobes 36. Electrical continuity is provided through shaft 26 or shafts 38 and 40 to rings 46 and 48 and through brushes 50 and 54 from the taps on windings 244 and 246 corresponding to the preselected digit to the terminals 58 and 60, which are common to windings 244 and 246 and are connected to capacitors 248 and 250, respectively.

The conductor arrays connecting contact members 30 to the individual taps on windings 244 and 246 may be molded into or disposed in any other suitable manner in members 56, each of which is a part of a fixed member 28, and may be joined to common conductors disposed in member 62. Members 56 are affixed to base board 64 in such manner as to fixedly support the structure comprising the preset digit selecting mechanism. Member 62 may also be affixed to members 56 in such manner as to insure proper alignment of the rotating components of the mechanism. The conductors disposed in members 56 and 62 are connected to contact members 30 through spring members 70 which are disposed between the contact member and conductor in such manner as to insure satisfactory contact between contact member 30 and contact member 32.

Each digit wheel is locked in the selected position by an individual detent mechanism comprising a spring member 72 and ball 73 disposed in fixed member 28 in such manner as to ride on the flange portion of the wheel, and a cooperating recessed portion 75 in the wheel.

In the embodiment shown in FIGS. 7 and 8, two separate shafts 38 and 40 each having a separate set of lobes 34 and 36, respectively, are employed. The contact members 30 are disposed in such manner that those connected to the individual taps of winding 244 are connected to terminal 58 by the lobes on one of the shafts and those connected to the individual taps of winding 246 are connected to terminal 60 by the lobes on the other shaft.

Also cooperating with the selector assembly is a manually operated mechanical motor 74 controlled by pushbutton 16 and adapted to drive shaft 26 which actuates lobes 34 and 36, and switch 78 for properly connecting the oscillator 52 to the telephone circuit (not shown). Beneath the pushbutton 16, which is mounted within the base of the telephone set, is an arm 80 pivoted about an axis and carrying a sector gear 82. The arm 80 is attached to one end of a tension spring 84 used for returning the arm and pushbutton to the normal or rest position. Tension spring 84 may be identified as the motor spring since energy stored therein is used for the operation of the calling mechanism. Mating with sector gear 82 is a spur gear 86 on shaft 88 which is coupled to shaft 26 by a band clutch 90 of a type well known to the art which allows free movement of the driving member (shaft 88) in one direction and positive connection between the driving and driven (shaft 26) during rotation in the opposite direction. Shaft 26 carries a notched collar 92 which cooperates with a detent member 94. Detent member 94 is pivoted about an axis substantially parallel to that of arm 80 and is biased against collar 92 by a suitable spring member 96. Detent 98 in either of the oppositely disposed notches of collar 92 (fixed on shaft 26) prevents any rotation of shaft 26 until the end of the depression stroke of pushbutton 16, acting through lever 94, releases it. Detent 98 then permits a full revolution of shaft 26 when the release of pushbutton 16 allows spring 84 through sector gear 82 and clutch 90 to drive shaft 26. A flyball governor of a type well known to the art (not shown) may be geared to shaft 26 to control its speed of rotation.

Coupled to shaft 26 through a conventional speed increasing gear assembly 100 is the cam operated switch 78 which includes a cam member 102 driven by the assembly 100 to provide the functions of the transfer switch D shown in FIG. 9. The mechanical design of the cam operated switch is such that lobes 34 and 36 will complete the signal frequency determining circuits selected by an individual digit wheel prior to the operation of switch D (FIG. 9). Upon the operation of switch D, the selected dual-frequency signal is generated and transferred over line TL to the telephone central office. Switch D may return to its normal position during the interval that lobes 34 and 36 are not engaging contact members 24. At the completion of a full revolution of shaft 26, all of the digits set up by the selecting mechanism will have been transmitted.

The digit wheel, selecting mechanism and shaft assemblies cooperate with a signaling circuit to translate the subscriber number displayed on the digit wheels and encoded in mechanical form into electrical signals. The signaling circuit shown in FIG. 9 is for two-out-of-five frequency signaling. It is understood, of course, that the present invention has application to other signaling systems as, for example, a one-out-of-ten frequency signaling system.

The signaling circuit includes a pair of switch-hook contacts 200 and 202 each connecting the telephone set to the telephone line TL. The set is connected to the switch-hook contacts by a pair of conductors 204 and 206. Bridged across the conductors 204 and 206 is the entire speech circuit 208 of the telephone set in series with a resistor 210 and a voltage limiting symmetrical diode 212. The speech circuit is of conventional design and well known to any worker skilled in the telephone art.

A transistor 211 includes a base electrode 214, an emitter electrode 216 and collector electrode 218, the emitter-collector circuit thereof being effectively connected across the diode 212. The base and collector electrodes have a bias voltage thereon equal to the voltage drop across the diode 212. The connection of the collector 218 to the diode 212 is through the first set of normally closed contacts of a transfer switch D and conductors 220 and 222. The base electrode 214 is connected to the bias diode 212 through the same conductor 222 and a pair of series windings or coils 224 and 226 which are respectively shunted by voltage limiting diodes 228 and 230. The emitter electrode is connected to the line conductor 206 by a pair of windings or coils 234 and 236, a conductor 238 and a dropping resistor 240. A branch circuit extending through conductor 242 and the second set of normally closed contacts of the transfer switch D includes a pair of windings or coils 244 and 246 in series and terminates at the line conductor 206. The windings or coils 224, 234 and 244 are all on a common core and inductively coupled together. The windings or coils 226, 236 and 246 are similarly on a single core and coupled to each other. Each of the coils 244 and 246 includes five tapped connections, one of which includes series capacitors 248 and 250, respectively. Lobes 34 and 36 are arranged to connect the capacitors 248 and 250 across sections of the coils 244 and 246, respectively.

The circuit is shown in the normal nonsignaling condition with the speech circuit in condition for enablement upon the lifting of the handset and closure of switchhook contacts 200 and 202. In the arrangement shown, upon the closure of the switchhook contacts 200 and 202, direct current flows from the central office battery (not shown) to the speech circuit 208 thence to the transfer switch D by way of the conductor 220 and thereafter returning to the battery by way of the conductor 206 after passage through the coils 244 and 246 and the conductor 242. Direct current also flowing from the speech circuit establishes a common voltage on the base electrode 214 and the collector electrode 218 by way of the coils 224 and 226, the transfer switch D and the conductor 220.

Upon operation of the preset call mechanism or signal control means the lobes 34 and 36 are arranged for successive connection to selected taps of the coils 244 and 246 in accordance with the settings of the digit wheels. After the connection of the lobes to a set of selected taps the direct current path to the coils through the transfer switch D is interrupted thereby producing discharge between the coil 244 and the associated capacitor 248 and a similar discharge between the coil 246 and the associated capacitor 250. This discharge is inductively coupled to both the base and emitter circuits of the transistor through the mutual coupling between the respective coils. At the time of operation of the transfer switch D, the opening of the second front contact allows the voltage on the collector electrode to rise by an amount equal to the voltage across the resistor 210 thereby conditioning the transistor for amplification. The closure of the back contact of the transfer switch D provides a low impedance shunt through conductor 220 and a resistor 258 across the speech circuit in order to eliminate any interference for signaling by the speech circuit.

The energy in the tapped coils 244 and 246 coupled to both the emitter and base circuits of the transistor is amplified therein and introduced onto the telephone line through the resistor 258, the back contact of transfer switch D, and conductor 220. The frequency of the amplified oscillation is determined by the closed taps of the coils and the amplitude is limited by the shunting diodes 228 and 230 appearing across coils 224 and 226, respectively.

The signaling circuit may be characterized as a dual frequency transistor oscillator which is shock-excited into oscillation by the simultaneous discharge of the two tuned circuits and having the amplitude of both discharges limited so as to prevent one frequency from dominating the other.

The signal generator circuit is controlled by the preset call mechanism which is adapted to arrange bridging contacts for closing selected taps on the tuning coils of the oscillator in accordance with the numbers appearing on the digit wheel. The preset mechanism is also adapted to scan the bridging contacts in a properly timed sequence and operate and restore the D transfer switch in the proper phase.

It is to be understood that the above-described arrangements are illustrative of the application of the principles of the invention. Other arrangements may be devised by those skilled in the art without departing from the spirit and scope of the invention.

What is claimed is:

1. A preset telephone calling mechanism comprising a plurality of manually controlled selectors for establishing the digits of a telephone number to be called, a signal generator including a plurality of individual tuning circuits, said tuning circuits comprising individual terminals and a common terminal, each of said tuning circuits being responsive to the connection of a respective one of said individual terminals to said common terminal for producing a discrete frequency, each of said selectors comprising a wheel, a plurality of radially disposed contact arms of varying length affixed to the web of said wheel, each of said arms including a contact member at each end, the centrally disposed contact members being arranged in a circular pattern, a shaft, said shaft being conductively connected to said common terminal, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to a respective one of said individual terminals of said tuning circuits and disposed in such manner as to engage the end contact of the radially disposed contact arm corresponding to the digit determined by the position of said selector, means disposed on said shaft in helical arrangement for sequentially engaging the centrally disposed contact members of said radially disposed arms representing the selected digits, motor means, means actuated by said motor means for causing said shaft to rotate and said helically arranged means to successively connect the common terminal of said tuning circuits to the individual terminals thereof selected in accordance with the setting of said selectors.

2. A preset telephone call transmitting system comprising a telephone line, a source of potential, a telephone set, said telephone set comprising a plurality of manually controlled selectors for establishing the digits of a telephone number to be called, a signal generator including output means and a plurality of individual tuning circuits, said tuning circuits comprising individual terminals and a common terminal, each of said tuning circuits being responsive to the connection of a respective one of said individual terminals to said common terminal for producing a discrete frequency, each of said selectors comprising a wheel, a plurality of radially disposed contact arms of varying length affixed to the web of said wheel, each of said arms including a contact member at each end, the centrally disposed contact members being arranged in a circular pattern, a shaft, said shaft being conductively connected to said common terminal, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to a respective one of said individual terminals of said tuning circuits and disposed in such manner as to engage the end contact of the radially disposed contact arm corresponding to the digit determined by the position of said selector, means disposed on said shaft in helical arrangement for sequentially engaging the centrally disposed contact members of said radially disposed arms representing the selected digits, switch means, motor means, first means actuated by said motor means for causing said shaft to rotate and said helically arranged means to successively connect the common terminal of said tuning circuits to the individual terminals thereof selected in accordance with the setting of said selectors, second means driven by said motor means for actuating said switch means to connect said tuning circuits to said potential source and disconnect said signal generator output means from said telephone line prior to the connection of said common terminal to an individual terminal of one of said tuning circuits, and to disconnect said tuning circuits from said potential source and connect said signal generator output means to said telephone line after said common terminal has been connected to an individual terminal of one of said tuning circuits.

3. A preset telephone call transmitter comprising a plurality of manually controlled selectors for establishing the digits of a telephone number to be called, a signal generator comprising two windings, each of said windings having a plurality of individual taps and a common terminal, each of said windings being responsive to the connection of a corresponding one of said individual taps to said common terminal for producing a discrete frequency, each of said selectors comprising a wheel, a plurality of radially disposed contact arms of varying length affixed to each side of the web of said wheel, each of said arms including a contact member at each end, the centrally disposed contact members being arranged in a circular pattern, a shaft, said shaft being conductively connected to said common terminals, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to an individual tap of said windings, the contact members connected to the taps of one of said windings being disposed on one side of said fixed member, the contact members connected to the taps of the other of said windings being disposed on the other side of said fixed member, a vertically aligned contact member on each side of said fixed member being disposed in such manner as to engage the end contact of the radially disposed contact arm on each side of the web of said wheel corresponding to the digit determined by the position of said selector, means disposed on said shaft in helical arrangement for sequentially engaging the individual pairs of centrally disposed contact members of said radially disposed arms representing the selected digits, motor means, means actuated by said motor means for causing said shaft to rotate and said helically arranged means to successively connect the common terminals of said windings to the individual pairs of taps thereof selected in accordance with the setting of said selectors.

4. A preset telephone call transmitting system comprising a telephone line, a source of potential, a telephone set, said telephone set comprising a plurality of manually controlled selectors for establishing the digits of a telephone number to be called, a signal generator comprising output means and two windings, each of said windings having a plurality of individual taps and a common terminal, each of said windings being responsive to the connection of any one of its respective individual taps to said common terminal for producing a discrete frequency, each of said selectors comprising a wheel, a plurality of radially disposed contact arms of varying length affixed to each side of the web of said wheel, each of said arms including a contact member at each end, the centrally disposed contact members being arranged in a circular pattern, a shaft, said shaft being conductively connected to said common terminals, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to an individual tap of said windings, the contact members connected to the taps of one of said windings being disposed on one side of said fixed member, the contact members connected to the taps of the other of said windings being disposed on the other side of said fixed member, a vertically aligned contact member on each side of said fixed member being disposed in such manner as to engage the end contact of the radially disposed contact arm on each side of the web of said wheel corresponding to the digit determined by the position of said selector, means disposed on said shaft in helical arrangement for sequentially engaging the individual pairs of centrally disposed contact members of said radially disposed arms representing the selected digits, switch means, motor means, first means actuated by said motor means for causing said shaft to rotate and said helically arranged means to successively connect the common terminals of said windings to the individual pairs of taps thereof selected in accordance with the setting of said selectors, second means driven by said motor means for actuating said switch means to connect said windings to said potential source and disconnect said signal generator output means from said telephone line prior to the connection of said common terminals to individual terminals of said windings, and to disconnect said windings from said potential source and connect said signal generator output means to said telephone line after said common terminals have been connected to individual terminals of said windings.

5. A preset telephone call transmitter comprising a plurality of manually controlled selectors for establishing the digits of a telephone number to be called, a signal generator comprising two windings, each of said windings having a plurality of individual taps and a common terminal, each of said windings being responsive to the connection of a corresponding one of said individual taps to said common terminal for producing a discrete frequency, each of said selectors comprising a wheel, a plurality of radially disposed contact arms of varying length affixed to each side of the web of said wheel, each of said arms including a contact member at each end, the centrally disposed contact members being arranged in a circular pattern, a shaft, said shaft comprising a centrally conducting rod portion having disposed thereon one group of helically arranged contact member engaging means and an insulated sleeve conducting portion having disposed thereon a separate group of helically arranged contact member engaging means, said shaft being conductively connected to said common terminals, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to an individual tap of said windings, the contact members connected to the taps of one of said windings being disposed on one side of said fixed member, the contact members connected to the taps of the other of said windings being disposed on the other side of said fixed member, a vertically aligned contact member on each side of said fixed member being disposed in such manner as to engage the end contact of the radially disposed contact arm on each side of the web of said wheel corresponding to the digit determined by the position of said selector, means disposed on said shaft in helical arrangement for sequentially engaging the individual pairs of centrally disposed contact members of said radially disposed arms representing the selected digits, motor means, means actuated by said motor means for causing said shaft to rotate and said helically arranged means to successively connect the common terminals of said windings to the individual pairs of taps thereof selected in accordance with the setting of said selectors.

6. A preset telephone call transmitter comprising a plurality of manually controlled selectors for establishing the digits of a telephone number to be called, a signal generator comprising two windings, each of said windings having a plurality of individual taps and a common terminal, each of said windings being responsive to the connection of a corresponding one of said individual taps to said common terminal for producing a discrete frequency, each of said selectors comprising a wheel, a plurality of radially disposed contact arms of varying length affixed to each side of the web of said wheel, each of said arms including a contact member at each end, the centrally disposed contact members being arranged in a circular pattern, a shaft, said shaft being conductively connected to said common terminals, a plurality of fixed members, each of said selectors being disposed between a pair of said fixed members, each of said wheels being supported by and rotatable about said shaft and the peripheries of said fixed members adjacent thereto, each of said fixed members functioning as a mounting for a plurality of vertically aligned contact members, two of said fixed members functioning as journals for said shaft, each of said vertically aligned contact members being connected to an individual tap of said windings, the contact members connected to the taps of one of said windings being disposed on one side of said fixed member, the contact members connected to the taps of the other of said windings being disposed on the other side of said fixed member, a vertically aligned contact member on each side of said fixed member being disposed in such manner as to engage the end contact of the radially disposed contact arm on each side of the web of said wheel corresponding to the digit determined by the position of said selector, means disposed on said shaft in helical arrangement for sequentially engaging the individual pairs of centrally disposed contact members of said radially disposed arms representing the selected digits, motor means, means actuated by said motor means for causing said shaft to rotate and said helically arranged means to successively connect the common terminals of said windings to the individual pairs of taps thereof selected in accordance with the setting of said selectors, said means actuated by said motor means comprising a segment gear connected to a pivoted arm member, said arm member being biased against rotation in one direction by a motor spring, pushbutton means for engaging said arm member to cause rotation thereof against the biasing action of said motor spring, a spur gear, clutch means, said spur gear being connected to said shaft through said clutch means and disposed in such manner as to engage said segment gear, said clutch means permitting rotation of said spur gear by said segment gear in one direction without rotation of said shaft, detent means normally engaging said shaft, said detent means being actuated by said pushbutton means after the completion of rotation of said spur gear in said one direction to release said shaft.

References Cited in the file of this patent

UNITED STATES PATENTS

| | | |
|---|---|---|
| 2,280,604 | Richard | Apr. 21, 1942 |
| 2,358,586 | Newell | Sept. 19, 1944 |
| 2,590,885 | Parkinson | Apr. 1, 1952 |
| 2,731,517 | Jeanne | Jan. 17, 1956 |
| 2,948,886 | McIlwain | Aug. 9, 1960 |